United States Patent [19]

Zweegers

[11] 4,407,114
[45] Oct. 4, 1983

[54] AGRICULTURAL IMPLEMENT

[76] Inventor: Petrus W. Zweegers, Nieuivendijk 46, Geldrop, Netherlands

[21] Appl. No.: 277,016

[22] Filed: Jun. 24, 1981

[30] Foreign Application Priority Data

Jul. 1, 1980 [NL] Netherlands .......................... 8003790

[51] Int. Cl.³ ...................... A01D 87/00; A01D 55/20
[52] U.S. Cl. ......................................... 56/344; 56/294; 56/504; 56/16.4; 241/101.7; 241/237; 241/243
[58] Field of Search ...................... 241/101.7, 237, 243; 56/13.8, 14.5, 14.6, 16.4, 294, 344, 500, 502, 504, 505, 12.5, 12.4

[56] References Cited

U.S. PATENT DOCUMENTS 4,299,078  11/1981  Werner ................................ 56/16.4

FOREIGN PATENT DOCUMENTS 44966   3/1981  European Pat. Off. ............. 56/344
1159683 12/1963 Fed. Rep. of Germany ........ 56/344
2018141 10/1971 Fed. Rep. of Germany ........ 56/344
244165   3/1976 Fed. Rep. of Germany ........ 56/333

1300776 12/1961 France .................................. 56/344

Primary Examiner—Robert Peshock
Assistant Examiner—John Weiss
Attorney, Agent, or Firm—Edmund M. Jaskiewicz

[57] ABSTRACT

An agricultural implement, particularly a pick-up wagon, comprises a pick-up member for picking up crop lying on the ground, an advance mechanism located behind the pick-up member, viewed in the intended direction of displacement of the crop and stationary cutters arranged behind the advance mechanism, between which stationary cutters the crop can be passed on with the aid of the advance mechanism, whereby the advance mechanism comprises a plurality of additional cutters adapted to rotate about a rotary axis during operation so that these rotating cutters displace the crop in the direction towards the stationary cutters and fingers adapted to reciprocate during operation and pushing the crop also in the direction towards the stationary cutters during operation, the arrangement being such that the rotating cutters move in between the reciprocating fingers.

6 Claims, 4 Drawing Figures

AGRICULTURAL IMPLEMENT

The invention relates to an agricultural implement, particularly a pick-up wagon, comprising a pick-up member for picking up crop lying on the ground, an advancing mechanism located behind the pick-up member viewed in the intended direction of displacement of the crop and cutters disposed behind the advancing mechanism, between which cutters the crop can be pushed with the aid of the advancing mechanism, the drive of which requires relatively high power.

The cutting effect in known agricultural implements of the kind set forth often leaves much to be desired, since in many cases the crop is pushed between the cutters by the advance mechanism in a manner such that at least large part of the crop is not cut.

The invention has for its object to provide an agricultural implement of the kind set forth by which the inconvenients inherent in the known agricultural implements can be mitigated.

According to the invention this can be achieved by providing the advance mechanism with a plurality of additional cutters adapted to rotate about a rotary axis during operation so that these rotating cutters displace the crop in the direction towards the first-mentioned cutters and with fingers adapted to reciprocate during operation for pushing the crop during operation also towards the first-mentioned cutters, the arrangement being such that the rotating cutters move between the reciprocating fingers.

In operation the crop will thus be initially compressed in a space bounded by the reciprocatory fingers, the first-mentioned cutters and the rotating cutters, after which the crop thus compressed is cut by the rotating cutters on the one hand and by the first-mentioned cutters on the other hand so that the crop is subjected to an effective cutting operation at a low consumption of power.

The invention will now be described more fully with reference to an embodiment of the construction according to the invention schematically shown in the accompanying Figures.

Figure 1:
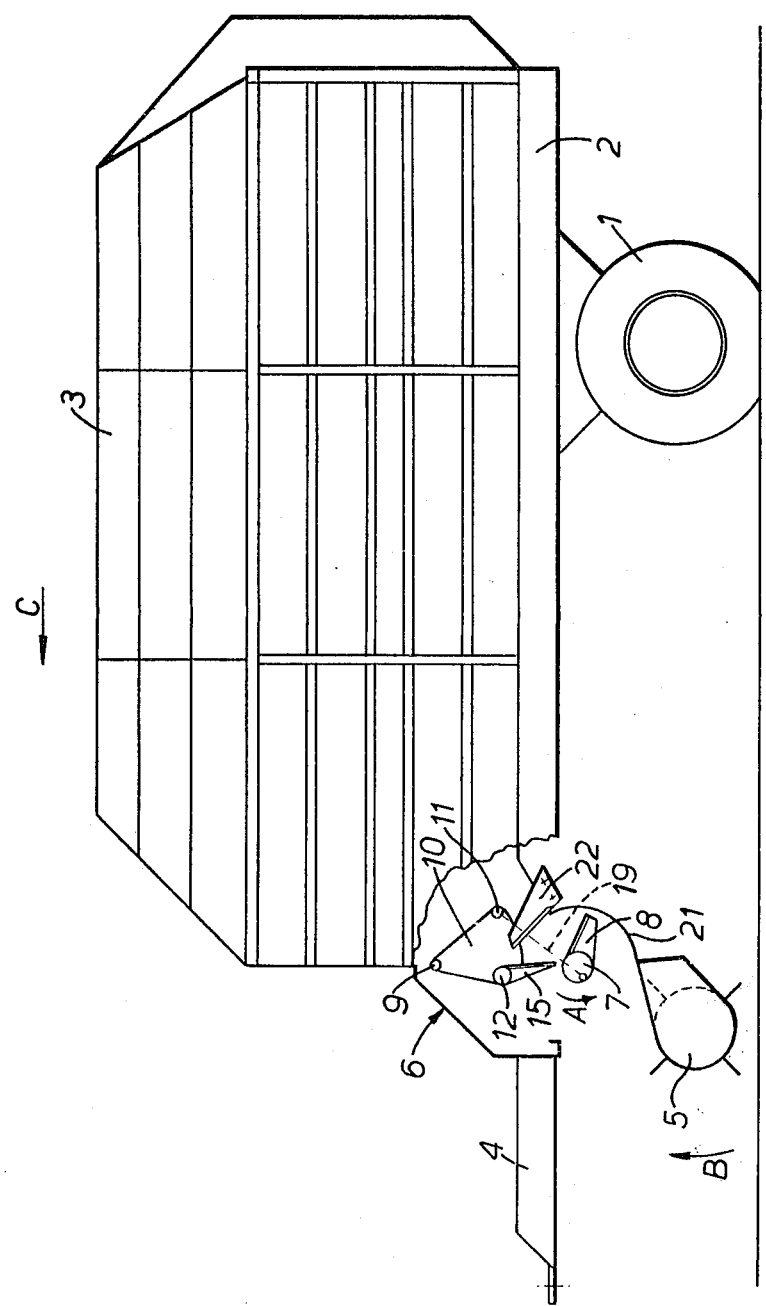
FIG. 1 is a schematic side elevation of an agricultural implement embodying the invention in the form of a pick-up wagon.

The pick-up wagon illustrated in FIG. 1 comprises a frame 2 supported by ground-engaging wheels 1 and having a superstructure 3 enclosing a loading space. At the front the pick-up wagon is provided with a drawbar 4 with the aid of which it can be coupled with an agricultural tractor or the like.

Figure 2:
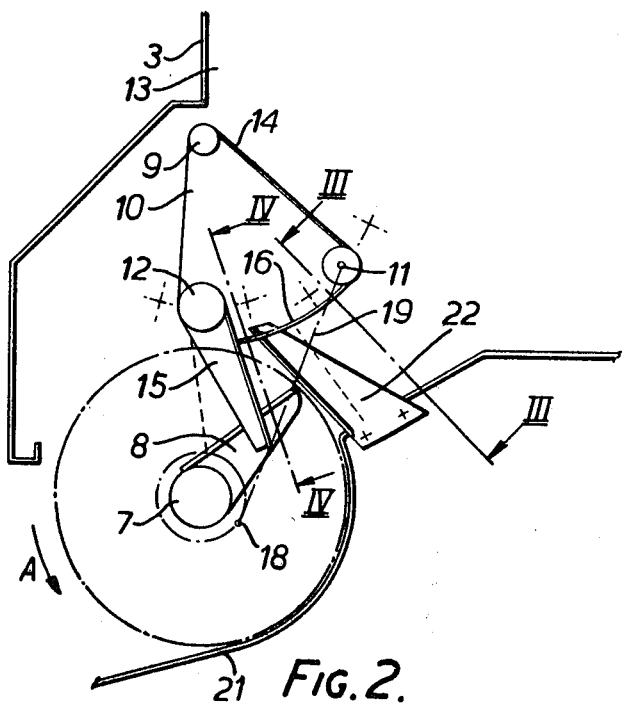
FIG. 2 is a schematic, enlarged view of the advance mechanism.
Figure 3:
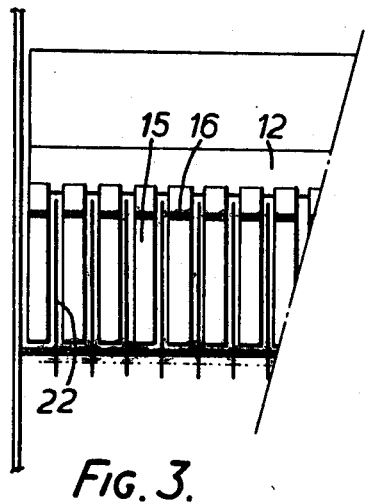
FIG. 3 shows part of the advance mechanism taken on the line III—III in FIG. 2.
Figure 4:
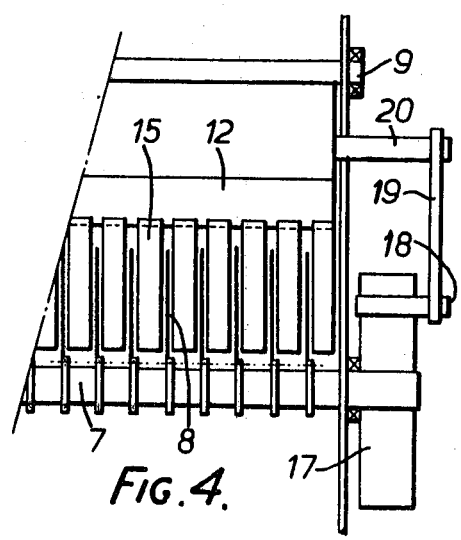
FIG. 4 shows part of the advance mechanism taken on the line IV—IV in FIG. 4.

The pick-up wagon furthermore comprises a known pick-up member 5 formed by a reel adapted to rotate in operation for picking up crop lying on the ground. Above the pick-up member is arranged an advance mechanism 6, which is shown in detail in FIGS. 2 to 4. From FIGS. 2 and 4 in particular, it will be apparent that the advance mechanism 6 comprises a horizontal shaft 7 extending transversely of the longitudinal direction of the wagon and having secured to it at equal intervals knives 8, which are all located one behind the other, viewed in the direction of length of the shaft 7.

At a given distance above the shaft 7 the frame of the pick-up wagon holds a rocking shaft 9 extending parallel to the shaft 7. To the ends of the rocking shaft 9 are fastened more or less triangular plates 10 in a manner such that the shaft 9 lies between cooresponding corners of said triangular plates 10. Located at the other corners of the plates 10, beams 11 and 12 are arranged parallel to the shaft 9. The beam 11 is located nearest the loading space 13 bounded by the superstructure 3 of the pick-up wagon, and a plate 14 is arranged between the rocking shaft 9 and the beam 11 so as to cover the whole width of the loading space 13.

To the beam 12 are fastened a plurality of fingers 15 extending downwards away from the beam 12 and being located one behind the other, viewed in the direction of length of the beam 12. The sides of the fingers 15 facing the loading space 13 are joined by the ends of curved strips 16, which extend between the beam 11 and the fingers 15.

To the end of the shaft 7 is fastened a fly-wheel 17, which is provided with a stub shaft 18 extending parallel to the shaft 7. The stub shaft 18 is pivoted with the aid of a coupling rod 19 to a prolongation 20 of the beam 11.

From the pick-up member 5 a guide plate 21 extends to the rear below the shaft 7 with its cutters 8 and upwards to the level of the shaft 7, said guide plate 21 being curved upwards over part of its length in accordance with the path described by the free ends of the cutters 8 rotating in the direction of the arrow A during operation. Then the guide plate 21 is inclined upwards and rearwards towards the loading space 13. This upwardly and rearwardly inclined part of the guide plate 21 has fastened to it cutters 22 in recesses, the top ends of the cutters 22 extending, as will be seen from FIG. 2, between the strips 16 as far as above said strips so that the cutters 22 cover the entire height of the passage bounded by the strips 16 and the guide plate 21. The cutting edges of the knives 22 facing the fingers 15 are substantially tangential to the circular path described by the free ends of the knives 8 during operation.

During operation both the pick-up member 5 and the advance member will be driven in common, for example, from the power take-off shaft of an agricultural tractor with the aid of a transmission mechanism (not shown). The pick-up member 5 will then rotate in the direction of the arrow B and during the advance of the pick-up wagon in the direction of the arrow C it will pick-up crop, for example, mown grass or the like, lying on the ground and push it over and across the guide plate 21 to the rear towards the advance member 6.

As stated above, the cutters 8 rotate with their cutting edges in leading position in the direction of the arrow A so that the crop deposited by the pick-up member 5 on the guide plate 21 is pushed by the cutters 8 over the guide plate to the rear and upwards towards the knives 22.

Since the shaft 11 is coupled with the aid of the coupling rod 19 with the fly-wheel 17 fastened to the shaft 7, the shaft 11 and hence also the shaft 12 with the fingers 15 fastened thereto will swing to and fro about the centre line of the rocking shaft 9. The arrangement is such that when the knives 8 move upwards towards the cutters 22 and thus rotate in between the fingers 15, these fingers 15 also shift in the direction towards the cutters 22. Thus the picked-up drop will initially be compressed in the space bounded by the fingers 15, the leading cutting edges of the knives 8, the cutting edges of the cutters 22 and the strips 16 reciprocating with the fingers 15. After a given degree of compression of the crop is reached, the knives 8 pre-cut the crop, which is then pushed by the fingers 15 between the cutters 22 to the rear into the loading space. In practice it has been found that in this way the crop is subjected to a particularly effective cutting operation, while the required power is low.

The crop accumulating in the loading space 13 is pushed to the rear by the pushing plate 14, which also reciprocates during operation and which prevents the crop from falling back into the space between the beams 9 and 11, so that a satisfactory degree of filling and compression of the crop in the loading space can be obtained, even if the bottom of the pick-up wagon is not provided with a rolling floor. As a matter of course, it is possible to use the advance member 5 also in other agricultural implements, for example, balers or the like.

I claim:

1. An agricultural implement, particularly a pick-up wagon, comprising a pick-up member (5) for picking-up crop lying on the ground, an advance mechanism located behind the pick-up member (5) viewed in the intended direction of displacement of the crop and having fingers (15) movable to and fro in a passage for displacing the crop towards stationary cutters (22) mounted in said passage behind the range of the movement of the fingers and a plurality of rotating cutters (8) rotatable about an axis (7), so that said rotating cutters (8) during rotation will pass through said passage and together with said moving fingers will displace the crop towards said stationary cutters (22) which have been disposed such that cutting edges of said stationary cutters (22) extend substantially tangential to a circle described by the free ends of said rotatable cutters (8) which move between the fingers (15) of the advance mechanism.

2. An agricultural implement as claimed in claim 1 characterized in that the passage is bounded by a plurality of strips extending from said movable fingers in a direction of said stationary cutters, the ends of the stationary cutters extending in between said strips.

3. An agricultural implement as claimed in any one of the preceding claims characterized in that a plate is connected with the moving fingers and extends upwardly above said fingers so as to move together with the fingers.

4. An agricultural implement as claimed in claim 3, characterized in that the strips extend between a lower edge of said plate and the fingers.

5. An agricultural implement as claimed in claim 3 characterized in that the fingers and the plate are adapted to pivot back and forth about a rocking shaft located near the top end of the plate, the plate being at an angle of about 50° to a line of connection between the rocking shaft and a beam to which are fastened top ends of the fingers.

6. An agricultural implement as claimed in claim 1 characterized in that said roating cutters and said stationary cutters each respectively are located in the same vertical plane.

* * * * *